United States Patent
Saito

(10) Patent No.: US 11,029,277 B2
(45) Date of Patent: Jun. 8, 2021

(54) GAS SENSOR

(71) Applicant: DENSO CORPORATION, Kariya (JP)

(72) Inventor: Akira Saito, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/601,859

(22) Filed: Oct. 15, 2019

(65) Prior Publication Data

US 2020/0041439 A1 Feb. 6, 2020

Related U.S. Application Data

(63) Continuation of application No. PCT/JP2018/015746, filed on Apr. 16, 2018.

(30) Foreign Application Priority Data

Apr. 18, 2017 (JP) .............................. JP2017-082286

(51) Int. Cl.
*G01N 27/00* (2006.01)
*G01N 27/407* (2006.01)
*F02D 41/14* (2006.01)
*G01N 27/406* (2006.01)

(52) U.S. Cl.
CPC ..... *G01N 27/4073* (2013.01); *F02D 41/1495* (2013.01); *G01N 27/4067* (2013.01)

(58) Field of Classification Search
CPC .......... F01N 11/007; F01N 11/00; F01N 3/10; F01N 2560/02; G01N 27/4077; G01N 27/26; G01N 27/4076; Y02T 10/40

See application file for complete search history.

(56) References Cited

U.S. PATENT DOCUMENTS

| | | | | |
|---|---|---|---|---|
| 2003/0062264 A1* | 4/2003 | Kitanoya | ........... | G01N 33/0054 204/424 |
| 2009/0211906 A1* | 8/2009 | Sugaya | .............. | G01N 27/4075 204/424 |
| 2012/0018304 A1* | 1/2012 | Mikami | ............. | G01N 27/4076 204/427 |

(Continued)

FOREIGN PATENT DOCUMENTS

| | | |
|---|---|---|
| JP | 11-153571 | 6/1999 |
| JP | 4198386 | 10/2008 |
| JP | 2014-38061 | 2/2014 |

*Primary Examiner* — Phuttiwat Wongwian
*Assistant Examiner* — Sherman D Manley
(74) *Attorney, Agent, or Firm* — Nixon & Vanderhye P.C.

(57) ABSTRACT

A gas sensor includes: a sensor element including a bottomed tubular solid electrolyte, a detection electrode, and a reference electrode; and a heater for heating the solid electrolyte. The reference electrode includes an inner detection section on an entire periphery in a circumferential direction at an endmost position on a tip side on the reference electrode, an inner connecting section on an entire periphery in the circumferential direction at an endmost position on a base end side on the reference electrode, and an inner lead section on a part in the circumferential direction at a position where the inner detection section is connected to the inner connecting section. A formation region in the circumferential direction of the inner lead section is reduced stepwise from the inner detection section toward the inner connecting section.

6 Claims, 8 Drawing Sheets

(56) References Cited

U.S. PATENT DOCUMENTS

| | | | | |
|---|---|---|---|---|
| 2012/0294563 A1* | 11/2012 | Thomson | ................ | G02F 1/015 |
| | | | | 385/2 |
| 2013/0306475 A1* | 11/2013 | Suzuki | ............... | G01N 27/4077 |
| | | | | 204/429 |
| 2015/0041334 A1* | 2/2015 | Matsuoka | ........... | F02D 41/0235 |
| | | | | 205/775 |
| 2015/0253282 A1* | 9/2015 | Satou | ................. | G01N 27/4077 |
| | | | | 204/429 |
| 2015/0308976 A1* | 10/2015 | Hu | ..................... | G01N 27/4076 |
| | | | | 204/424 |
| 2016/0202210 A1 | 7/2016 | Nakata et al. | | |
| 2017/0016849 A1* | 1/2017 | Ohtsuka | ............. | G01N 27/4076 |
| 2017/0219513 A1* | 8/2017 | Kayama | ................. | G01N 27/41 |
| 2018/0045673 A1* | 2/2018 | Sato | ....................... | C01G 53/70 |
| 2019/0323986 A1* | 10/2019 | Solanskey | .......... | G01N 27/4077 |

* cited by examiner

GAS SENSOR

CROSS-REFERENCE TO RELATED APPLICATION

This application is a U.S. application under 35 U.S.C. 111(a) and 363 that claims the benefit under 35 U.S.C. 120 from International Application No. PCT/JP2018/015746 filed on Apr. 16, 2018, the entire contents of which are incorporated herein by reference. This application is also based on and claims the benefit of the priority of Japanese Patent Application No. 2017-082286 filed on Apr. 18, 2017, the contents of which are incorporated herein by reference.

BACKGROUND

Technical Field

The present disclosure relates to a gas sensor.

Background Art

A technique for designing a detection electrode of an oxygen sensor to be a partial electrode is known. In the oxygen sensor, a formation region in a circumferential direction of the detection electrode provided on an outer surface of a solid electrolyte becomes smaller at a position farther from a heater at a tip portion of the solid electrolyte.

SUMMARY

An aspect of the present disclosure is a gas sensor including: a sensor element including a solid electrolyte, a detection electrode that is provided on an outer surface of the solid electrolyte, and a reference electrode that is provided on an inner surface of the solid electrolyte; and a heater that has a tip portion including a heating section for heating the solid electrolyte, wherein: the reference electrode includes an inner detection section, an inner connecting section, and an inner lead section; and the formation region in the circumferential direction of the inner lead section is reduced stepwise or reduced to form a tapered shape from the inner detection section toward the inner connecting section.

BRIEF DESCRIPTION OF THE DRAWINGS

Objects, features, advantages, and the like of the present disclosure will be more clarified by the following detailed description with reference to the accompanying drawings. The drawings of the present disclosure are as follows.

DETAILED DESCRIPTION OF THE PREFERRED EMBODIMENTS

Figure 1:
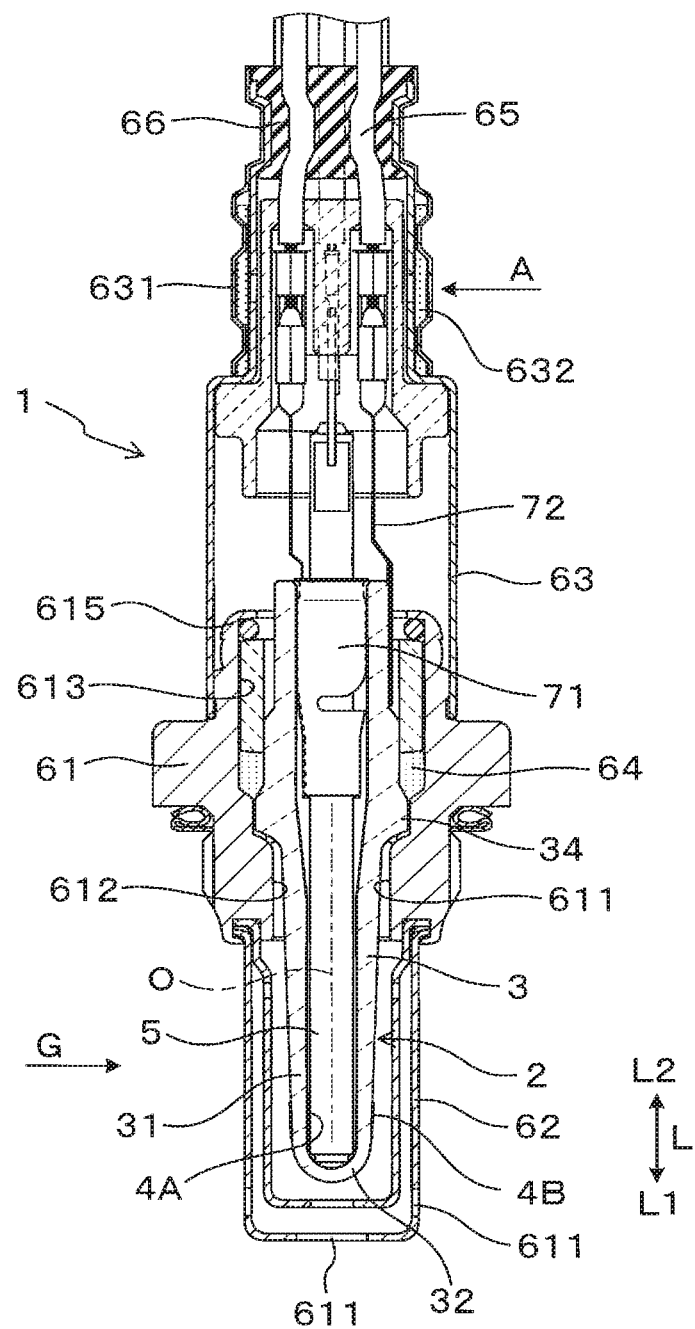
FIG. 1 is an explanatory view showing a cross section of a gas sensor, according to an embodiment.

A preferred embodiment of the above-described gas sensor will be described with reference to the drawings. Reference signs in parentheses for components shown in an aspect of the present disclosure indicate a correspondence relationship with reference signs in the drawings of an embodiment, but do not limit the components only to the components of the embodiment.

A gas sensor arranged in an exhaust pipe of an internal combustion engine uses exhaust gas flowing in the exhaust pipe as detection gas (measurement gas) and detects gas, for example, on the basis of a difference in oxygen concentration between the detection gas and reference gas such as air. For example, the gas sensor is used to detect whether an air-fuel ratio of the internal combustion engine obtained from composition of the exhaust gas is on a fuel rich side or on a fuel lean side with respect to a theoretical air-fuel ratio or to quantitatively detect an air-fuel ratio of the internal combustion engine obtained from the exhaust gas.

The gas sensor includes a bottomed tubular sensor element in which electrodes are arranged on an inner surface and an outer surface of a bottomed tubular solid electrolyte or a plate-shaped sensor element in which electrodes are arranged on both surfaces of a plate-shaped solid electrolyte. In particular, in the bottomed tubular sensor element, a heater for heating the solid electrolyte and the electrodes to an active temperature is arranged inside the solid electrolyte. Furthermore, in the bottomed tubular sensor element, the electrode provided on the inner surface of the solid electrolyte serves as a reference electrode and is exposed to reference gas such as air, and the electrode provided on the outer surface of the solid electrolyte serves as a detection electrode and is exposed to detection gas.

The detection electrode of the bottomed tubular sensor element is known to be designed to be a partial electrode by being provided on a part in a circumferential direction of the outer surface of the solid electrolyte. On the other hand, the reference electrode of the bottomed tubular sensor element is typically provided on an entire periphery in the circumferential direction of the inner surface of the solid electrolyte.

For example, JP 4198386 B discloses a technique for designing a detection electrode of an oxygen sensor to be a partial electrode. In the oxygen sensor, a formation region in a circumferential direction of the detection electrode provided on an outer surface of a solid electrolyte becomes smaller at a position farther from a heater at a tip portion of the solid electrolyte.

In the bottomed tubular sensor element, a detection section of the detection electrode arranged on the outer surface of the solid electrolyte is provided at a position on a tip side on the solid electrolyte, and in order to effectively heat the detection section, a heating section of the heater is also provided at a position on the tip side on the solid electrolyte. Furthermore, at a position closer to a base end side on the solid electrolyte than the detection section, the solid electrolyte is held by a housing of the gas sensor. Thus, when the solid electrolyte is heated by the heater, a temperature at the position on the tip side on the solid electrolyte is higher than a temperature at the position on the base end side on the solid electrolyte.

The solid electrolyte held by the housing causes a phenomenon in which heat is transferred from the solid electrolyte to the housing. Due to an influence of the heat transfer to the housing, therefore, the temperature at the position on the base end side on the solid electrolyte is further lowered. The influence of the heat transfer depends on a thermal conductivity of a material constituting the solid electrolyte and a thermal conductivity of a material constituting the electrodes. As compared with the solid electrolyte composed of a ceramic material, the electrodes composed of a metal material have a high thermal conductivity. In order to reduce the heat transfer, therefore, it is effective to reduce an area of the electrodes.

Performance required for the gas sensor includes quick heating of the solid electrolyte to a high temperature to achieve early activation of the solid electrolyte and the electrodes. The early activation may be achieved by a reduction in the amount of heat transfer to the housing by designing not only the detection electrode but also the reference electrode to be a partial electrode. In the oxygen sensor of Patent Literature 1, since the detection electrode is designed to be a partial electrode, the influence of heat transfer to a housing can be mitigated.

Depending on the intended use of the gas sensor including the sensor element, however, it is necessary to more appropriately control a temperature distribution in an axial direction from the tip side to the base end side of the axial direction of the sensor element. It has been found that in order to achieve a target temperature distribution of the sensor element, it is necessary to further employ an ingenious method to form a shape of the reference electrode designed to be a partial electrode.

The present disclosure is to provide a gas sensor capable of making a temperature distribution in an axial direction of a sensor element close to a target temperature distribution by adjusting a shape and a width in a circumferential direction of an inner lead section of a reference electrode.

An aspect of the present disclosure is a gas sensor including: a sensor element including a solid electrolyte that has ionic conductivity and in which a tip portion of a tube having a tubular shape is blocked by a bottom having a curved surface, a detection electrode that is provided on an outer surface of the solid electrolyte and is exposed to detection gas, and a reference electrode that is provided on an inner surface of the solid electrolyte and is exposed to reference gas; and a heater that has a tip portion including a heating section for heating the solid electrolyte and is arranged inside the solid electrolyte so that a tip of the tip portion is in contact with the inner surface of the bottom, wherein: the reference electrode includes an inner detection section that is provided on an entire periphery in a circumferential direction around a center axis of the tube at a position that is an endmost position on a tip side on the reference electrode and faces the heating section, an inner connecting section that is provided on an entire periphery or a part in the circumferential direction of the tube at an endmost position on a base end side on the reference electrode and is connected to an inner terminal metal fitting, and an inner lead section that is provided on a part in the circumferential direction of the tube at a position where the inner detection section is connected to the inner connecting section and that is formed in a formation region in the circumferential direction smaller than a formation region in the circumferential direction of the inner connecting section; and the formation region in the circumferential direction of the inner lead section is reduced stepwise or reduced to form a tapered shape from the inner detection section toward the inner connecting section.

In the gas sensor, an ingenious method has been employed to form the reference electrode of the sensor element having a bottomed tubular shape.

The reference electrode includes the inner detection section, the inner connecting section, and the inner lead section. A width in the circumferential direction of the inner lead section is reduced stepwise or reduced to form a tapered shape from the inner detection section toward the inner connecting section. Furthermore, the tip of the tip portion including the heating section of the heater is in contact with the inner surface of the bottom of the solid electrolyte. According to this configuration, in the gas sensor in which the sensor element and the heater are arranged in a housing, the inner detection section of the reference electrode is appropriately heated by the heating section, and it is possible to appropriately reduce heat transfer from the inner detection section to the base end side of the sensor element through the inner lead section and the inner connecting section.

In a temperature distribution in an axial direction along the center axis of the sensor element, a temperature around the inner detection section can be maintained as close to uniform as possible at a high temperature suitable for activation of the solid electrolyte and the electrodes. Furthermore, the temperature distribution in the axial direction of the sensor element can be made close to a target temperature distribution by adjusting the shape and the width in the circumferential direction of the inner lead section of the reference electrode.

The configuration of the inner lead section of the reference electrode is particularly effective when the gas sensor is used to detect, on the basis of a difference in oxygen concentration between the detection electrode in contact with exhaust gas and the reference electrode in contact with air, an electromotive force generated between the detection electrode and the reference electrode. As described in detail later in an embodiment, according to the configuration of the inner lead section, when an air-fuel ratio of an internal combustion engine is in a slightly rich region which is on a fuel rich side and is close to a theoretical air-fuel ratio, a gradient of a line indicating a relationship between the air-fuel ratio and the electromotive force is steep, and detection accuracy of the air-fuel ratio in the slightly rich region can be improved.

In the sensor element and the gas sensor, a side on which the bottom of the sensor element is provided is referred to as tip side, and a side opposite to the tip side is referred to as base end side.

According to an aspect of the present disclosure, it is possible to provide a gas sensor capable of making a temperature distribution in an axial direction of a sensor element close to a target temperature distribution by adjusting a shape and a width in a circumferential direction of an inner lead section of a reference electrode.

Embodiment

Figure 2:
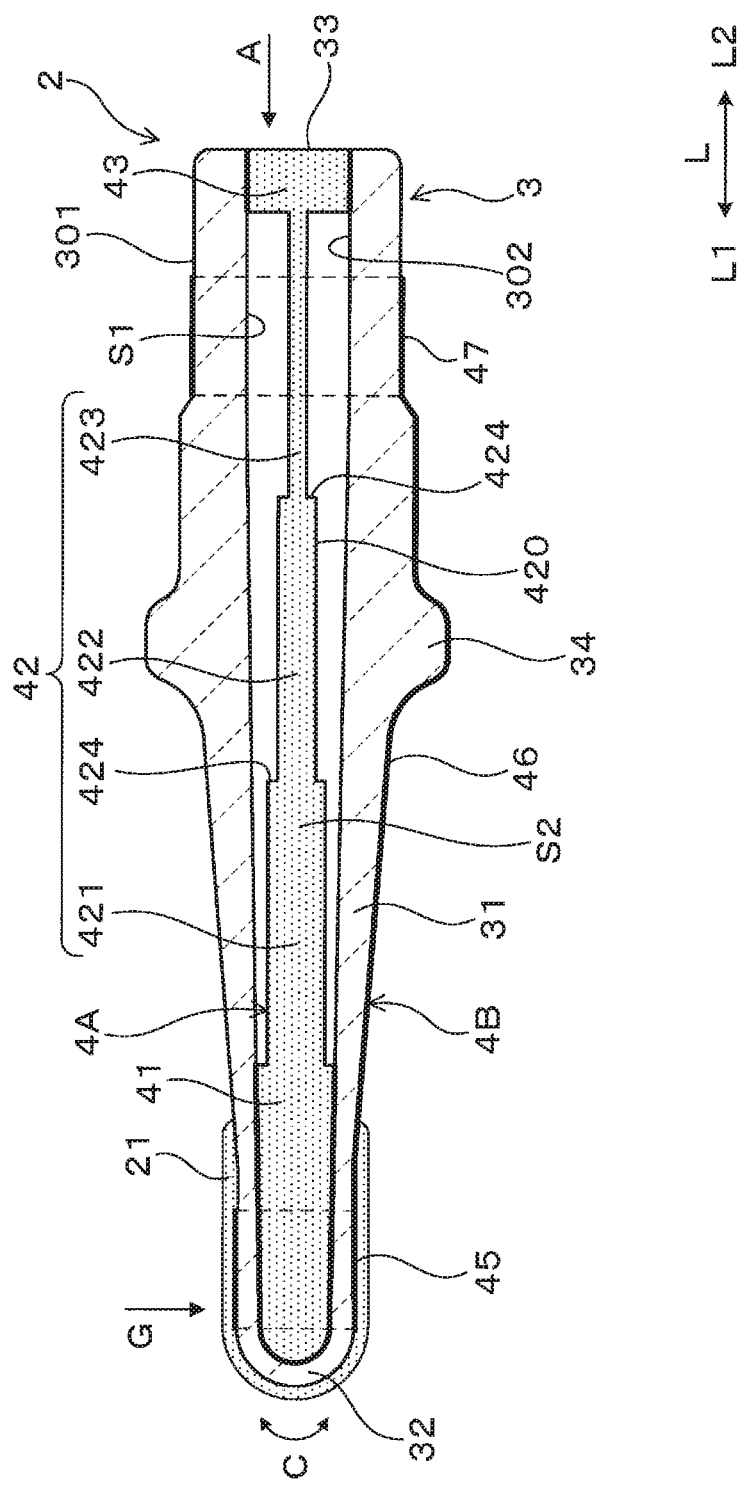
FIG. 2 is an explanatory view showing a formation state of a reference electrode of a sensor element, according to the embodiment.
Figure 3:
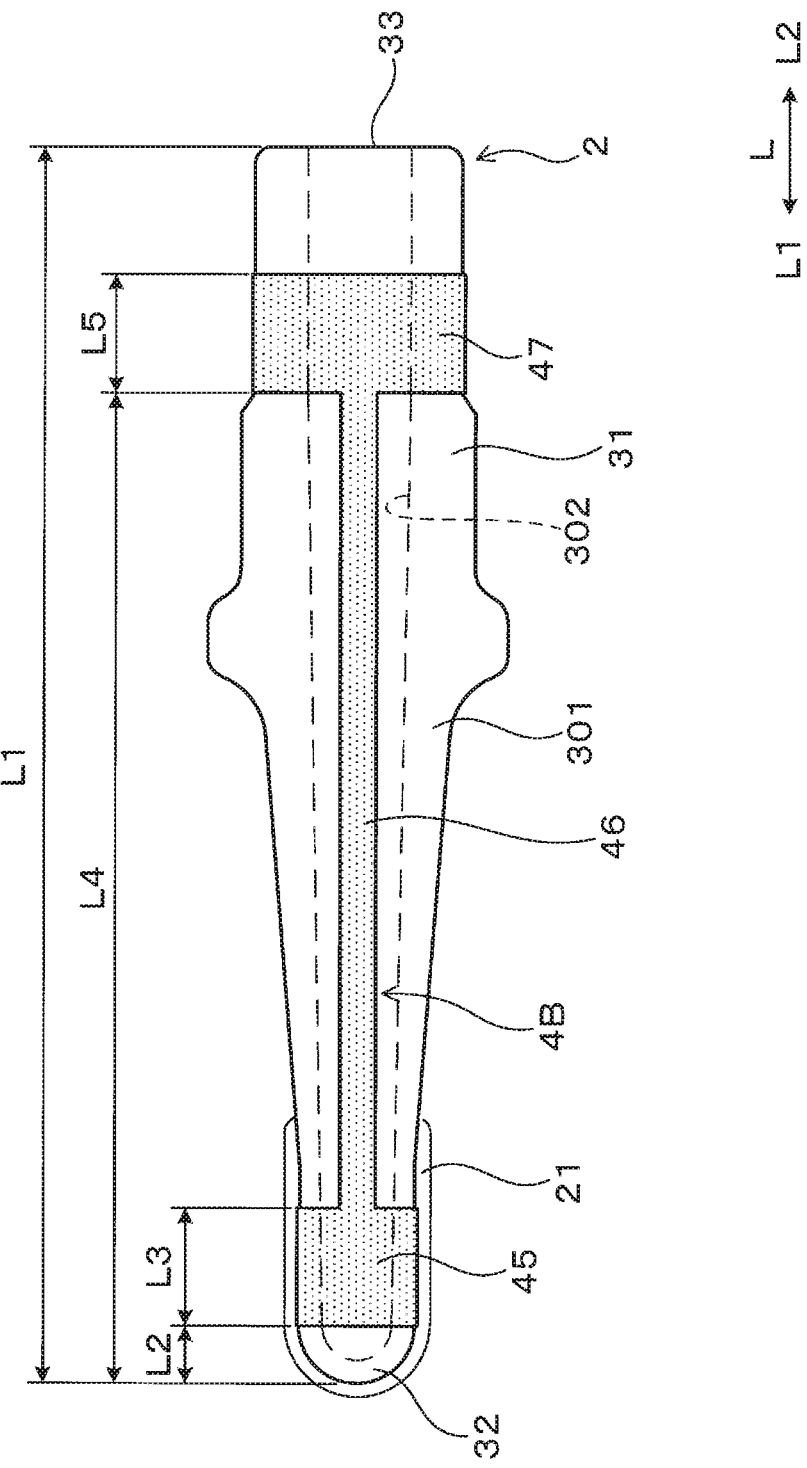
FIG. 3 is an explanatory view showing a formation state of a detection electrode of the sensor element, according to the embodiment.
Figure 4:
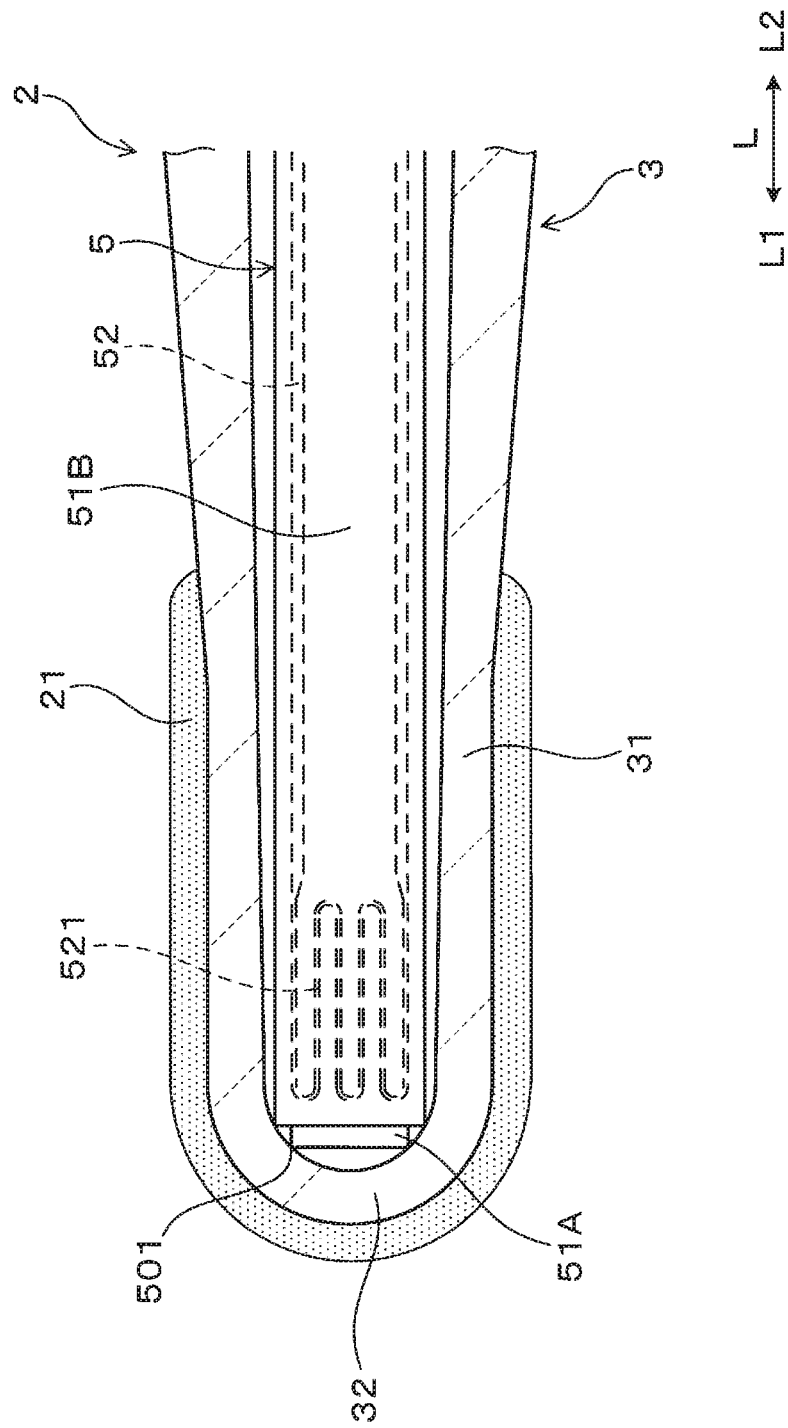
FIG. 4 is an explanatory view showing a part of the sensor element and a heater, according to the embodiment.

As shown in FIG. 1, a gas sensor 1 of the present embodiment includes a sensor element 2 and a heater 5. As shown in FIGS. 2 and 3, the sensor element 2 includes a solid electrolyte 3 that has ionic conductivity and in which a tip portion of a tube 31 having a tubular shape is blocked by a bottom 32 having a curved surface, a detection electrode 4B that is provided on an outer surface 301 of the solid electrolyte 3 and is exposed to detection gas (measurement gas) G, and a reference electrode 4A that is provided on an inner surface 302 of the solid electrolyte 3 and is exposed to reference gas A. As shown in FIG. 4, the heater 5 has a tip portion including a heating section 521 for heating the solid electrolyte 3, and is arranged inside the solid electrolyte 3 so that a tip 501 of the tip portion is in contact with the inner surface 302 of the bottom 32.

Figure 5:
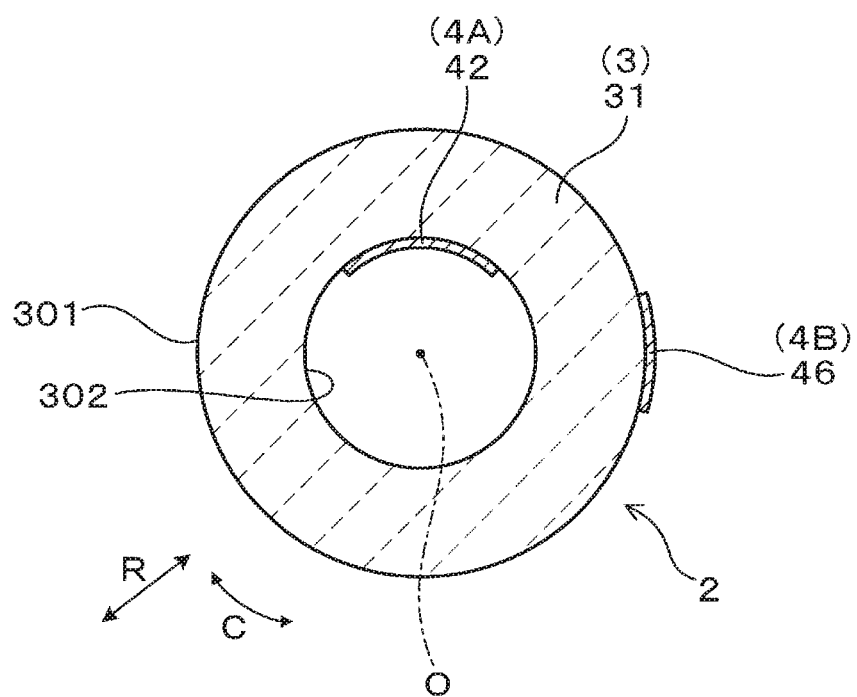
FIG. 5 is an explanatory view showing a cross section in a direction orthogonal to an axial direction of the sensor element at a portion of the sensor element at which an inner lead section of the reference electrode and an outer lead section of the detection electrode are formed, according to the embodiment.

As shown in FIG. 2, the reference electrode 4A includes an inner detection section 41, an inner connecting section 43, and an inner lead section 42. The inner detection section 41 is provided on an entire periphery in a circumferential direction C around a center axis O of the tube 31 at a position that is an endmost position on a tip side L1 on the reference electrode 4A and faces the heating section 521. As shown in FIGS. 1 and 2, the inner connecting section 43 is provided on an entire periphery in the circumferential direction C of the tube 31 at an endmost position on a base end side L2 on the reference electrode 4A and is connected to an inner terminal metal fitting 71. As shown in FIGS. 2 and 5, the inner lead section 42 is provided on a part in the circumferential direction C of the tube 31 at a position where the inner detection section 41 is connected to the inner connecting section 43. A formation region in the circumferential direction C of the inner lead section 42 is reduced stepwise from the inner detection section 41 toward the inner connecting section 43.

In the sensor element 2 and the gas sensor 1 of the present embodiment, a direction along the center axis O of the sensor element 2 is referred to as axial direction L, a direction around the center axis O of the sensor element 2 is referred to as circumferential direction C, and a direction radiating from the center axis O of the sensor element 2 is referred to as radial direction R. Furthermore, in the sensor element 2 and the gas sensor 1, a side on which the bottom 32 of the sensor element 2 is provided is referred to as tip side L1, and a side opposite to the tip side L1 is referred to as base end side L2.

The gas sensor 1 of the present embodiment will be described in detail below.
(Internal Combustion Engine)

The gas sensor 1 is arranged in an exhaust pipe in which exhaust gas discharged from an internal combustion engine (engine) of a vehicle flows. The gas sensor 1 detects gas by using the exhaust gas flowing in the exhaust pipe as the detection gas G and using air as the reference gas A. The gas sensor 1 of the present embodiment is used as an oxygen sensor (also referred to as A sensor) that detects an electromotive force generated between the detection electrode 4B and the reference electrode 4A through the solid electrolyte 3 and determines whether an air-fuel ratio of the internal combustion engine obtained from composition of the exhaust gas is on a fuel rich side on which a ratio of fuel to air is greater than a theoretical air-fuel ratio or on a fuel lean side on which the ratio of fuel to air is smaller than the theoretical air-fuel ratio.

The gas sensor 1 is used to make the air-fuel ratio of the internal combustion engine close to the theoretical air-fuel ratio at which catalytic activity of a three-way catalyst arranged in the exhaust pipe is effectively maintained. The gas sensor 1 may be arranged at a position on an upstream side or a downstream side of a flow of the exhaust gas from an arrangement position of the three-way catalyst in the exhaust pipe.

In particular, the gas sensor 1 of the present embodiment is capable of appropriately maintaining a temperature distribution in the axial direction L of the sensor element 2, and thus the gas sensor 1 of the present embodiment can be effectively used even when the exhaust gas of the internal combustion engine has a lower temperature. Furthermore, in the exhaust pipe, the exhaust gas at the position on the downstream side from the arrangement position of the three-way catalyst has a lower temperature than at the position on the upstream side from the arrangement position of the three-way catalyst. The gas sensor 1 of the present embodiment is preferably arranged at the position on the downstream side from the arrangement position of the three-way catalyst at which the exhaust gas has a lower temperature. At the position on the upstream side from the arrangement position of the three-way catalyst, an air-fuel ratio sensor for detecting an air-fuel ratio may be arranged and used in combination with the oxygen sensor for combustion control of the internal combustion engine.
(Sensor Element 2)

As shown in FIG. 2, the solid electrolyte 3 of the sensor element 2 contains zirconia as a main component and is composed of stabilized zirconia or partially stabilized zirconia obtained by replacing part of zirconia with a rare earth metal element or an alkaline earth metal element. The solid electrolyte 3 may be composed of yttria stabilized zirconia or yttria partially stabilized zirconia. At a predetermined activation temperature, the solid electrolyte 3 has ionic conductivity that allows oxide ions ($O^{2-}$) to be conducted. The detection electrode 4B and the reference electrode 4A contain platinum that exhibits catalytic activity for oxygen and a material constituting the solid electrolyte 3.

The bottom 32 of the solid electrolyte 3 has a hemispherical surface, and the tube 31 of the solid electrolyte 3 has a cylindrical shape. An opening 33 that allows the reference gas A to flow into an inside of the solid electrolyte 3 is formed at a position on a side opposite to the bottom 32 in the axial direction L of the solid electrolyte 3. An outer diameter of each portion in the axial direction L of the tube 31 appropriately varies in consideration of attachment to a housing 61.

As shown in FIGS. 1 and 3, the detection electrode 4B includes an outer detection section 45, an outer connecting section 47, and an outer lead section 46. The outer detection section 45 is provided on an entire periphery in the circumferential direction C around the center axis O of the tube 31 at a position that is an endmost position on the tip side L1 on the detection electrode 4B and faces the inner detection section 41 with the solid electrolyte 3 interposed therebetween. The outer connecting section 47 is provided on an entire periphery in the circumferential direction C of the tube 31 at an endmost position on the base end side L2 on the detection electrode 4B and is connected to an outer terminal metal fitting 72. The outer lead section 46 is provided on a part in the circumferential direction C of the tube 31 at a position where the outer detection section 45 is connected to the outer connecting section 47.

The inner detection section 41 of the reference electrode 4A is longer in the axial direction L than the outer detection section 45, and faces an entire inner portion of the outer detection section 45 with the solid electrolyte 3 interposed therebetween.

The outer connecting section 47 of the detection electrode 4B may be formed only on a part in the circumferential direction C of the outer surface 301 of the tube 31. In this case, a formation region in the circumferential direction C of the outer lead section 46 is smaller than a formation region in the circumferential direction C of the outer connecting section 47.

As shown in FIG. 2, the inner lead section 42 of the reference electrode 4A of the present embodiment is formed so that the formation region in the circumferential direction C is reduced in three steps from the tip side L1 toward the base end side L2 of the axial direction L. In the inner lead section 42, a formation region in the circumferential direction C of a tip side portion 421 located at an end most position on the tip side L1 is largest, a formation region in the circumferential direction C of an intermediate portion 422 adjacent to the base end side L2 of the tip side portion 421 is smaller than the formation region in the circumferential direction C of the tip side portion 421, and a formation region in the circumferential direction C of a base end side portion 423 adjacent to the base end side L2 of the intermediate portion 422 is smaller than the formation region in the circumferential direction C of the intermediate portion 422. A level difference 424 is formed between the tip side portion 421 and the intermediate portion 422 and between the intermediate portion 422 and the base end side portion 423. A formation region in the axial direction L of the inner lead section 42 is longer than a formation region in the axial direction L of the inner detection section 41 or a formation region in the axial direction L of the inner connecting section 43.

The tip side portion 421, the intermediate portion 422, and the base end side portion 423 are formed parallel to the center axis O of the tube 31 and the axial direction L. In other words, both side ends 420 in the circumferential direction C of the tip side portion 421, the intermediate portion 422, and the base end side portion 423 are parallel to the axial direction L. The level difference 424 between the tip side portion 421 and the intermediate portion 422 and the level difference 424 between the intermediate portion 422 and the base end side portion 423 may be formed orthogonal to the axial direction L or formed to be inclined with respect to the axial direction L.

The inner lead section 42 may be formed so that the formation region in the circumferential direction C is reduced in two steps from the tip side L1 toward the base end side L2 of the axial direction L. In this case, both side ends in the circumferential direction C of a tip side portion and a base end side portion of the inner lead section 42 whose formation region is reduced in two steps are formed parallel to the axial direction L. Alternatively, the inner lead section 42 may be formed so that the formation region in the circumferential direction C is reduced in four or more steps from the tip side L1 toward the base end side L2 of the axial direction L.

The inner detection section 41 of the reference electrode 4A is provided so as to be continuous with an entire periphery at a position on the tip side L1 of the inner surface 302 of the tube 31 and an entire portion of the inner surface 302 of the bottom 32. The tip 501 of the tip portion of the heater 5 is in contact with the inner detection section 41 on the inner surface 302 of the bottom 32. On the other hand, the outer detection section 45 of the detection electrode 4B is not provided on the outer surface 301 of the bottom 32.

The inner connecting section 43 of the reference electrode 4A may be formed only on a part in the circumferential direction C of the inner surface 302 of the tube 31. In this case, the formation region in the circumferential direction C of the inner lead section 42 is smaller than the formation region in the circumferential direction C of the inner connecting section 43.

The inner lead section 42 and the outer lead section 46 are formed parallel to the center axis O and the axial direction L at a single position in the circumferential direction C. Furthermore, a virtual line passing through a center in the circumferential direction C of the inner lead section 42 is parallel to the axial direction L.

A relative positional relationship between a position in the circumferential direction C on the detection electrode 4B where the outer lead section 46 is formed and a position in the circumferential direction C on the reference electrode 4A where the inner lead section 42 is formed can be arbitrarily determined. As an example, FIGS. 2 and 5 show the inner lead section 42 and the outer lead section 46 formed at positions shifted by 90° from each other in the circumferential direction C.

A minimum cross-sectional area in a direction orthogonal to the axial direction L of the inner lead section 42 of the reference electrode 4A and a minimum cross-sectional area in the direction orthogonal to the axial direction L of the outer lead section 46 of the detection electrode 4B are determined in a range that ensures a resistance value that does not affect an output voltage of the gas sensor 1 and causes no problem in terms of heat resistance.

Furthermore, similarly to the detection sections 41 and 45, the inner lead section 42 located close to the inner detection section 41 and the outer lead section 46 located close to the outer detection section 45 themselves also exhibit a function of detecting gas.

At a tip portion of the sensor element 2, a protective layer 21 composed of porous ceramics is provided to cover at least an entire portion of the outer detection section 45 of the detection electrode 4B. The protective layer 21 is provided to prevent the detection electrode 4B from being poisoned or wetted with water.

(Electrode Forming Method)

Next, a method of forming the reference electrode 4A and the detection electrode 4B on the solid electrolyte 3 will be described.

The reference electrode 4A and the detection electrode 4B of the present embodiment are formed by electroless plating. The electroless plating is performed to a solid electrolyte composed of a material electrically inactive at room temperature. Thus, after an activation process is performed to a portion of the solid electrolyte to which plating is to be applied, the solid electrolyte is subjected to the electroless plating.

Specifically, a porous carrier that is composed of a porous rubber material, sponge material, felt material, or the like and has a predetermined shape is impregnated with an active paste obtained by dissolving an organic platinum compound in an organic solvent and adjusting viscosity using a binder or the like. Then, by bringing the porous carrier into contact with the solid electrolyte 3 so that a pattern shape of the reference electrode 4A and the detection electrode 4B is drawn, the active paste is attached to the solid electrolyte 3.

Next, by performing heat treatment to the solid electrolyte 3 including the active paste, organic matter in the active paste is removed, and platinum atoms in the organic platinum compound of the active paste are fixed to the solid electrolyte 3. Thus, an electrode pattern of the reference electrode 4A and the detection electrode 4B is formed. The heat treatment may be separately performed after the active paste for forming the reference electrode 4A is attached to the solid electrolyte 3 and after the active paste for forming the detection electrode 4B is attached to the solid electrolyte 3.

Subsequently, the electrode pattern of the solid electrolyte 3 is immersed in an electroless platinum plating liquid containing a reducing agent, so that the platinum is deposited on the electrode pattern. Thus, the reference electrode 4A and the detection electrode 4B are formed on the solid electrolyte 3.

Instead of drawing a pattern shape of the reference electrode 4A and the detection electrode 4B by using the porous carrier, an electrode pattern may also be formed by using masking rubber to mask portions of the inner surface 302 and the outer surface 301 of the solid electrolyte 3 on which no electrode is to be formed. Furthermore, instead of performing the electroless plating, the electrodes 4A and 4B may be formed by performing electroplating or by using a paste containing platinum fine particles.

The electroless plating using the porous carrier is preferable in order to form an electrode pattern with higher accuracy, a complicated electrode pattern, or the like. The electroless plating is also preferable in terms of improvement in sensitivity to a very small amount of gas component in the exhaust gas, thickness accuracy, heat resistance, and the like.

An electrode reduction rate on the inner surface 302 of the solid electrolyte 3 of the reference electrode 4A designed to be a partial electrode of the present embodiment is in the following range. As shown in FIG. 2, assume that S1 represents a surface area of an entire portion of the inner surface 302 of the solid electrolyte 3 and S2 represents a surface area of a part of the entire portion of the inner surface 302 of the solid electrolyte 3 on which the reference electrode 4A is formed. The electrode reduction rate is indicated by (S1−S2)/S1 as a rate of a surface area of a part of the entire portion of the inner surface 302 of the solid electrolyte 3 on which a reduction of the reference electrode 4A is made. The electrode reduction rate has a relationship of $0.3 \leq (S1-S2)/S1 \leq 0.7$. A critical significance of this numerical range will be shown in Confirmation Test 1 described later.

An average thickness of the reference electrode 4A is in the range of 0.4 to 1.6 μm. A critical significance of this numerical range will be shown in Confirmation Test 2 described later. The inner detection section 41, the inner lead section 42, and the inner connecting section 43 which are the portions of the reference electrode 4A are formed to have a uniform thickness. However, the reference electrode 4A has many pores, and the many pores include pores formed so as to be continuous from an inside to a surface of the reference electrode 4A. The average thickness of the reference electrode 4A is obtained by measuring a thickness at ten points in a plane direction of the reference electrode 4A and calculating an average value of the thicknesses at the ten points.

(Another Sensor Element 2)

Figure 6:
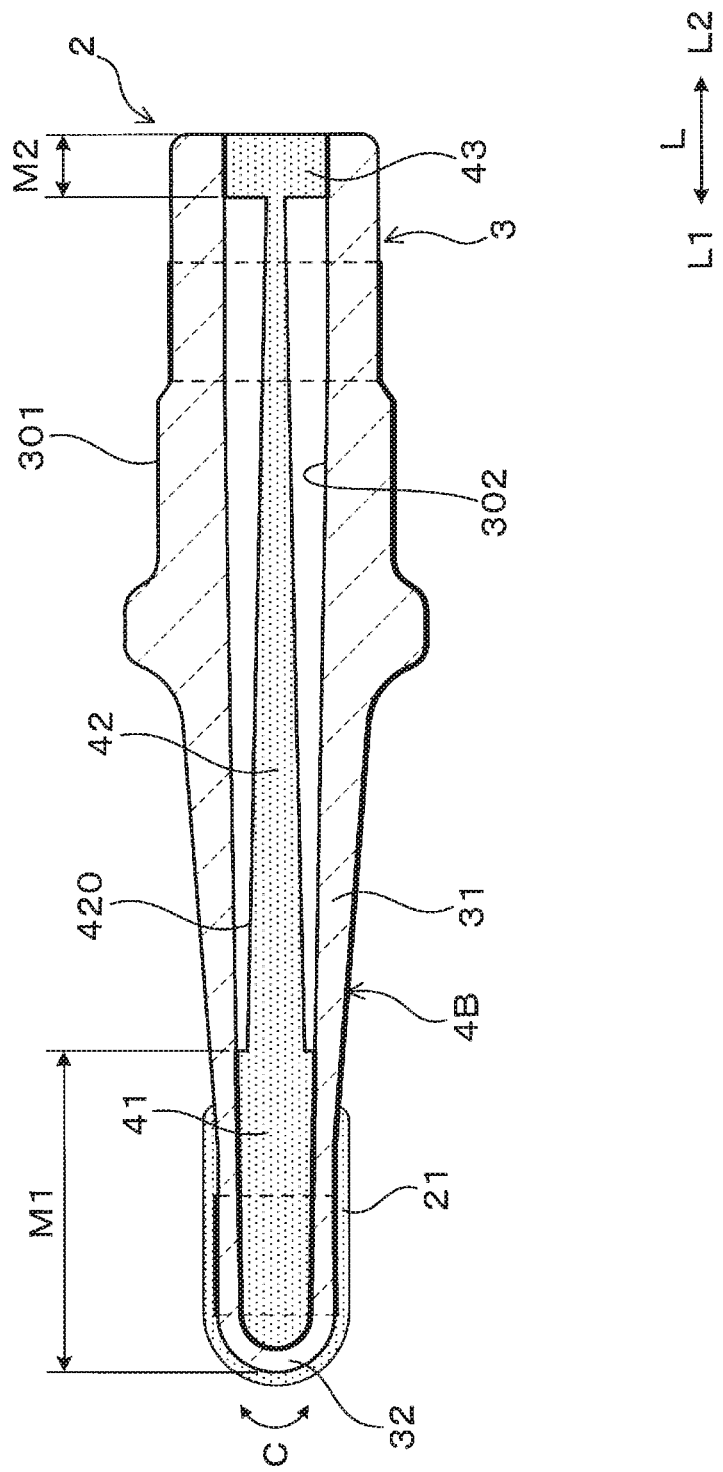
FIG. 6 is an explanatory view showing a formation state of a reference electrode of another sensor element, according to the embodiment.

As shown in FIG. 6, the inner lead section 42 of the reference electrode 4A may be formed so that the formation region in the circumferential direction C is reduced to form a tapered shape from the tip side L1 toward the base end side L2 of the axial direction L. The tapered formation region in the circumferential direction C of the inner lead section 42 continuously varies from the inner detection section 41 to the inner connecting section 43. The formation region in the axial direction L of the inner lead section 42 is longer than the formation region in the axial direction L of the inner detection section 41 or the formation region in the axial direction L of the inner connecting section 43. The both side ends 420 in the circumferential direction C of the inner lead section 42 form a gently tapered shape. When the reference electrode 4A is developed on a plane, an inclination angle between both ends in the circumferential direction C of the inner lead section 42 is in the range of 2 to 10°.

(Heater 5)

As shown in FIG. 4, the heater 5 includes substrates 51A and 51B that are composed of ceramics and a heating element 52 that is provided on the substrate 51B and is constituted by a conductor. The heating section 521 has a smallest cross-sectional area in the heating element 52, and generates heat by Joule heat when the heating element 52 is energized. At a tip portion of the heating element 52, the heating section 521 is formed to have a shape meandering in the axial direction L. The heater 5 is formed by winding, around the substrate 51A serving as a spindle, the substrate 51B that has a sheet shape and includes the heating element 52. The tip 501 of the substrate 51A serving as a spindle is in contact with the inner surface 302 of the inner detection section 41 of the reference electrode 4A.

(Other Configuration of Gas Sensor 1)

As shown in FIG. 1, in addition to the sensor element 2 and the heater 5, the gas sensor 1 includes the housing 61 that holds the sensor element 2, a tip side cover 62 attached to a tip side portion of the housing 61, a base end side cover 63 attached to a base end side portion of the housing 61, the inner terminal metal fitting 71 attached to the inner surface 302 of a base end side portion of the sensor element 2, the outer terminal metal fitting 72 attached to the outer surface 301 of the base end side portion of the sensor element 2, and the like.

(Housing 61)

As shown in FIG. 1, in order to hold the sensor element 2, the housing 61 has an insertion hole 611 that passes through the housing 61 in the axial direction L. The insertion hole 611 has a small-diameter hole portion 612 that is located on the tip side L1 of the axial direction L and a large-diameter hole portion 613 that is located on the base end side L2 of the axial direction L and has a larger diameter than the small-diameter hole portion 612. The sensor element 2 is inserted into the small-diameter hole portion 612 and the large-diameter hole portion 613 of the insertion hole 611, and is held via a sealing material 64, such as talc powder or a sleeve, that is arranged in a space between the sensor element 2 and the large-diameter hole portion 613.

Furthermore, a flange portion 34 which is a portion of the sensor element 2 having a largest outer diameter is fixed to an end of the small-diameter hole portion 612. This prevents the sensor element 2 from protruding from the insertion hole 611 toward the tip side L1. The base end side portion in the axial direction L of the housing 61 includes a crimping portion 615 that is bent toward an inner peripheral side. The sealing material 64 is compressed in the axial direction L between the crimping portion 615 and the flange portion 34, and thus the sensor element 2 is held by the housing 61. A tip side portion of the sensor element 2, in particular, a tip side portion of the sensor element 2 including the inner detection section 41 and the outer detection section 45 is arranged to protrude from the housing 61 toward the tip side L1 of the axial direction L.

(Tip Side Cover 62 and Base End Side Cover 63)

As shown in FIG. 1, the tip side cover 62 for protecting the sensor element 2 by covering the portion of the sensor element 2 protruding from the housing 61 toward the tip side L1 is attached to the tip side portion in the axial direction L of the housing 61. The tip side cover 62 is arranged in the exhaust pipe. The tip side cover 62 has a gas passage hole 621 through which the detection gas G passes. The tip side cover 62 may have a double structure or a single structure. The exhaust gas as the detection gas G flowing from the gas passage hole 621 of the tip side cover 62 into an inside of the tip side cover 62 passes through the protective layer 21 of the sensor element 2 and is guided to the detection electrode 4B.

The base end side cover 63 is attached to the base end side portion in the axial direction L of the housing 61. The base end side cover 63 is arranged outside the exhaust pipe. A portion of the base end side cover 63 has an introduction hole 631 for introducing air as the reference gas A into an inside of the base end side cover 63. At the introduction hole 631, a filter 632 that does not allow liquid to pass through but allows gas to pass through is arranged. The reference gas A introduced from the introduction hole 631 into the inside of the base end side cover 63 passes through a space inside the base end side cover 63 and is guided to the reference electrode 4A on the inner surface 302 of the sensor element 2.

As shown in FIG. 1, the inner terminal metal fitting 71 in contact with the inner connecting section 43 of the reference electrode 4A is attached to the inner surface 302 of the base end side portion of the sensor element 2. Furthermore, the outer terminal metal fitting 72 in contact with the outer connecting section 47 of the detection electrode 4B is attached to the outer surface 301 of the base end side portion of the sensor element 2. To the inner terminal metal fitting 71 and the outer terminal metal fitting 72, a lead wire 65 for electrically connecting the reference electrode 4A and the detection electrode 4B of the sensor element 2 to an external control unit is attached. The lead wire 65 is held by a bush 66 arranged inside the base end side cover 63.

In the use of the gas sensor 1 of the present embodiment as the oxygen sensor, when an air-fuel ratio is in a slightly rich region close to the theoretical air-fuel ratio on the fuel rich side, the gas sensor 1 can be used as a special air-fuel ratio sensor. When the gas sensor 1 is used as the air-fuel ratio sensor, a minute change in output voltage of the gas sensor 1 is detected.

In other words, the gas sensor 1 of the present embodiment can be used to detect, on the basis of an electromotive force, an air-fuel ratio at which an excess air ratio A is in the range of 0.97 to 1.00, where the excess air ratio A is 1.00 when the theoretical air-fuel ratio is 14.5. The excess air ratio A is a value obtained by dividing an air mass flow supplied to the internal combustion engine by a minimum air mass flow theoretically required for complete combustion of fuel.

(Effects)

In the gas sensor 1 of the present embodiment, an ingenious method has been employed to form the reference electrode 4A of the sensor element 2 having a bottomed tubular shape.

The reference electrode 4A includes the inner detection section 41, the inner connecting section 43, and the inner lead section 42. The formation region in the circumferential direction C of the inner lead section 42 is reduced stepwise from the inner detection section 41 toward the inner connecting section 43. Furthermore, the tip 501 of the tip portion including the heating section 521 of the heater 5 is in contact with the inner surface 302 of the bottom 32 of the solid electrolyte 3. According to this configuration, in the gas sensor 1 in which the sensor element 2 and the heater 5 are arranged in the housing 61, the inner detection section 41 of the reference electrode 4A is appropriately heated by the heating section 521, and it is possible to appropriately reduce heat transfer from the inner detection section 41 to the base end side L2 of the sensor element 2 through the inner lead section 42 and the inner connecting section 43.

In a temperature distribution in the axial direction L along the center axis O of the sensor element 2, a temperature around the inner detection section 41 can be maintained as close to uniform as possible at a high temperature suitable for activation of the solid electrolyte 3 and the electrodes 4A and 4B. Furthermore, the temperature distribution in the axial direction L of the sensor element 2 can be made close to a target temperature distribution by adjusting the shape and the formation region in the circumferential direction C of the inner lead section 42 of the reference electrode 4A.

Figure 7:
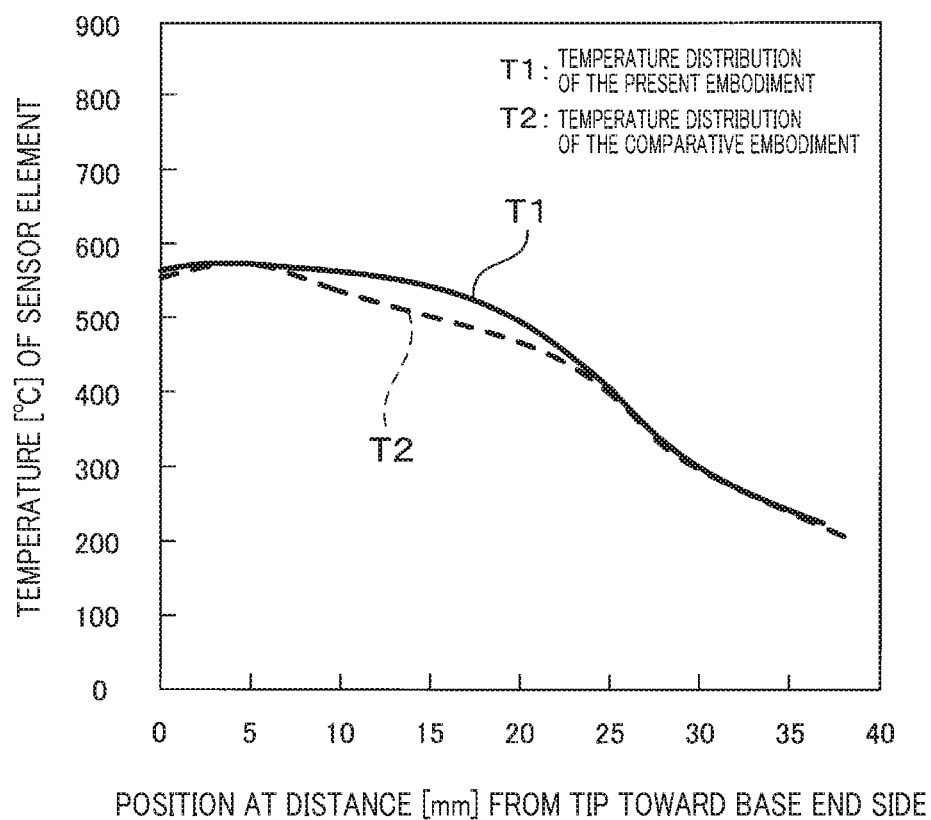
FIG. 7 is a graph showing a relationship between a position at a distance from a tip toward a base end side on the sensor element and a temperature of the sensor element, according to the embodiment.

FIG. 7 shows a relationship between a position at a distance (mm) from a tip in the axial direction L toward the base end side L2 of the axial direction L of the outer surface 301 of the bottom 32 of the sensor element 2 and a temperature (° C.) of the sensor element 2 at each position. FIG. 7 shows a temperature distribution T1 in the axial direction L of the sensor element 2 of the present embodiment including the reference electrode 4A designed to be a partial electrode and a temperature distribution T2 in the axial direction L of a sensor element of a comparative embodiment including the reference electrode 4A on an entire portion of the inner surface 302 of the solid electrolyte 3.

FIG. 7 shows that the temperature in a region at a distance in the range of 5 to 25 mm from the tip of the sensor element 2 of the present embodiment is higher than that of the sensor element 2 of the comparative embodiment. In the sensor element 2 of the present embodiment, the temperature is maintained to be close to a target temperature of 500° C. in a region at a distance in the range of 5 to 20 mm from the tip of the sensor element 2, which is a region in the axial direction L of the solid electrolyte 3 in which the outer detection section 45 and the inner detection section 41 are arranged. This shows that the reference electrode 4A designed to be a partial electrode is more likely to achieve a target temperature distribution of the sensor element 2.

In the sensor element 2 in which the tip 501 of the tip portion including the heating section 521 of the heater 5 is in contact with the inner surface 302 of the bottom 32 of the solid electrolyte 3, the portion on the tip side L1 of the sensor element 2 is more heated than the portion on the base end side L2 of the sensor element 2. Furthermore, since the portion on the base end side L2 of the sensor element 2 is held by the housing 61, heat transfer occurs from the portion on the base end side L2 of the sensor element 2 to the housing 61. In the sensor element 2 of the present embodiment, since the formation region of the reference electrode 4A is reduced at the position where the inner lead section 42 is formed, heat transfer is less likely to occur from the tip side L1 to the base end side L2 of the sensor element 2. Thus, due to a higher thermal conductivity of the reference electrode 4A than the solid electrolyte 3, with the reduction in the formation region of the reference electrode 4A, heat transfer is less likely to occur from the tip side L1 to the base end side L2 of the sensor element 2.

This effect in which heat transfer is less likely to occur is also obtained by reducing the detection electrode 4B by designing the detection electrode 4B to be a partial electrode. However, as compared with a distance between the detection electrode 4B and the heater 5, a distance between the reference electrode 4A and the heater 5 is small, and thus the reference electrode 4A is located close to the heater 5. Accordingly, the reduction of the inner lead section 42 of the reference electrode 4A makes the effect significant in which heat transfer is less likely to occur from the tip side L1 to the base end side L2 of the sensor element 2, and the temperature of the sensor element 2 can be more appropriately maintained.

The configuration of the inner lead section 42 of the reference electrode 4A is effective when the gas sensor 1 is used as the oxygen sensor and is used as the air-fuel ratio sensor only when the air-fuel ratio is in the slightly rich region close to the theoretical air-fuel ratio on the fuel rich side.

Figure 8:
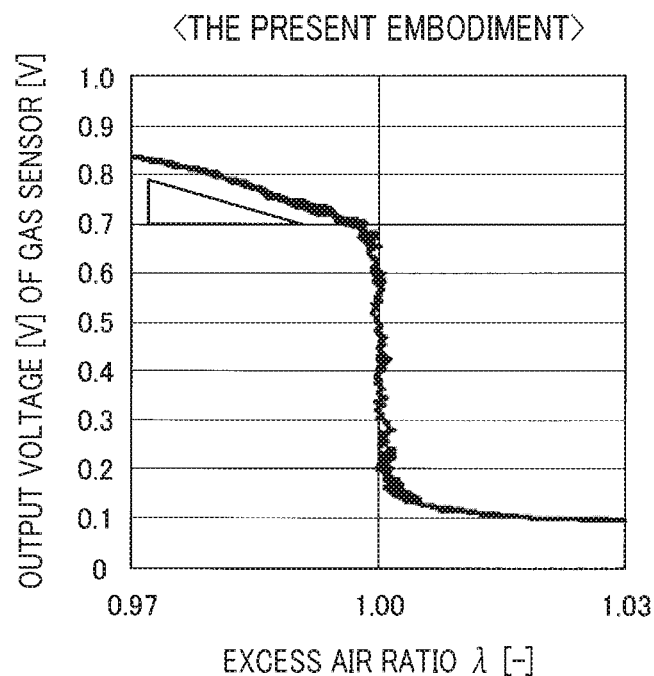
FIG. 8 is a graph showing a relationship between an excess air ratio and an output voltage of the gas sensor, according to the embodiment.
Figure 9:
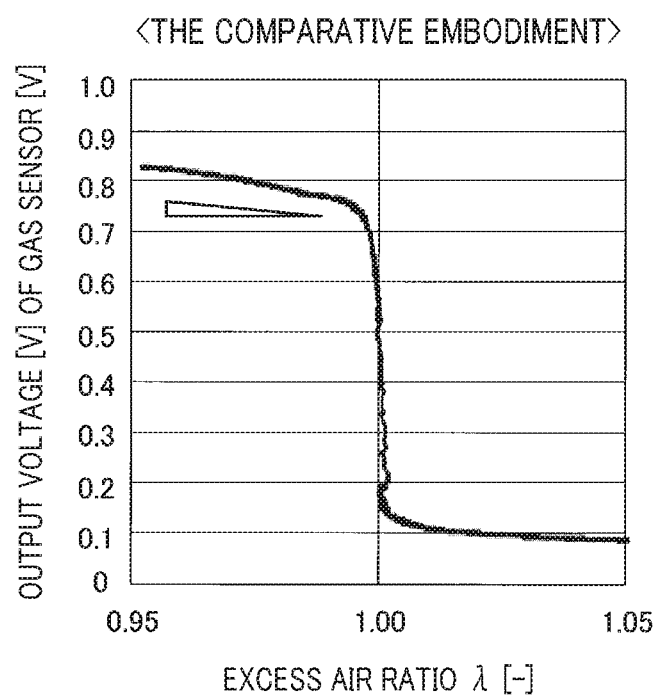
FIG. 9 is a graph showing a relationship between an excess air ratio and an output voltage of a gas sensor, according to a comparative embodiment.

FIG. 8 shows a relationship between an excess air ratio λ and an output voltage (V) of the gas sensor 1 including the sensor element 2 of the present embodiment. FIG. 9 shows a relationship between an excess air ratio λ and an output voltage (V) of the gas sensor 1 including the sensor element of the comparative embodiment including the reference electrode 4A on the entire portion of the inner surface 302 of the solid electrolyte 3.

A boundary between the rich region and the lean region with respect to the theoretical air-fuel ratio is present close to the excess air ratio λ of 1. In the lean region in which the excess air ratio λ is in the range of 1 or more, an output voltage of the gas sensor 1 of approximately 0.1 V is outputted. On the other hand, in the slightly rich region in which the excess air ratio λ is in the range of 0.97 to 1, an output voltage of the gas sensor 1 of approximately 0.7 to 0.83 V is outputted. The output voltage in the slightly rich region is gradually increased from a stoichiometric value (theoretical air-fuel ratio) of λ=1 toward the rich side. In the present embodiment, a gradient of the change in which the output voltage is increased with respect to the change in the excess air ratio A, in other words, a gradient of a relationship line indicating a relationship between the excess air ratio λ (or air-fuel ratio) and the output voltage (or electromotive force) is assumed to be a rate of change of the output voltage.

A rate of change of the output voltage in the slightly rich region of the sensor element 2 of the present embodiment shown in FIG. 8 is greater than a rate of change of the output voltage in the slightly rich region of the sensor element of the comparative embodiment shown in FIG. 9. In other words, a relationship line for the slightly rich region of the sensor element 2 of the present embodiment is steeper than a relationship line for the slightly rich region of the sensor element of the comparative embodiment. Thus, in the sensor element 2 of the present embodiment, when an air-fuel ratio (excess air ratio A) in the slightly rich region is detected, a small change in the air-fuel ratio can be easily detected as a change in the output voltage. Accordingly, the gas sensor 1 of the present embodiment can improve detection accuracy of the air-fuel ratio in the slightly rich region. This characteristic in which the rate of change of the output voltage in the slightly rich region is greater is highly due to the above-described configuration of the reference electrode 4A designed to be a partial electrode.

Depending on composition of the exhaust gas, the detection electrode 4B of the sensor element 2 is switched between a state in which unburned gases such as HC (hydrocarbon) and CO (carbon monoxide) are adsorbed and a state in which NOx (nitrogen oxide) is adsorbed. When the air-fuel ratio of the exhaust gas in contact with the detection electrode 4B of the sensor element 2 is on the fuel rich side, unburned gases such as HC (hydrocarbon) and CO (carbon monoxide) in the rich gas are adsorbed on Pt (platinum) of the detection electrode 4B. Next, when the air-fuel ratio of the exhaust gas in contact with the detection electrode 4B is switched from the fuel rich side to the fuel lean side, NO and the like in the lean gas are adsorbed on Pt of the detection electrode 4B, and HC, CO, and the like adsorbed on Pt are desorbed from Pt of the detection electrode 4B.

In this case, even when the sensor element 2 has detected that the air-fuel ratio of the exhaust gas is on the fuel rich side, NO is adsorbed on portions from which HC, CO, and the like have been desorbed. Thus, when the sensor element 2 has detected that the air-fuel ratio of the exhaust gas is on the fuel rich side in a region close to the theoretical air-fuel ratio, the output voltage of the gas sensor 1 is slightly reduced. This causes a gentle gradient of the output voltage from the slightly rich region to the theoretical air-fuel ratio. The gentle gradient of the output voltage is also caused by faster desorption of HC than CO due to the higher adsorption energy of CO on Pt than the adsorption energy of HC on Pt.

If the reference electrode 4A is formed on the entire portion of the inner surface 302 of the solid electrolyte 3, a temperature is lower at the base end side portion than at the tip side portion of the reference electrode 4A. Accordingly, HC, CO, and the like in the rich gas at the base end side portion at a low temperature are less likely to be desorbed, and the output voltage of the gas sensor 1 is more likely to be maintained in the range from the slightly rich region to the region close to the theoretical air-fuel ratio. Thus, the gradient of the output voltage in the slightly rich region becomes gentle.

On the other hand, as shown in FIG. 7, in the reference electrode 4A of the present embodiment designed to be a partial electrode, a difference in temperature between the inner detection section 41 of the reference electrode 4A and the inner lead section 42 of the reference electrode 4A is small. Accordingly, in particular, HC, CO, and the like in the rich gas adsorbed on the inner lead section 42 are desorbed faster, and the output voltage of the gas sensor 1 is slightly less likely to be maintained in the range from the slightly rich region to the region close to the theoretical air-fuel ratio. Thus, the gradient of the output voltage in the slightly rich region becomes steep.

The temperature of the outer detection section 45 and the inner detection section 41 of the sensor element 2 is preferably maintained in the range of 400 to 600° C. When the temperature of the outer detection section 45 and the inner detection section 41 of the sensor element 2 is lower, a difference in adsorption energy between HC and CO (described later) is more likely to be caused and the gradient of the output voltage of the gas sensor 1 in the slightly rich region is more likely to be steep. When the outer detection section 45 and the inner detection section 41 have a temperature of less than 400° C., however, catalytic activity of the detection electrode 4B and the reference electrode 4A may be reduced, and this may cause the output voltage of the gas sensor 1 to be unstable. On the other hand, when the outer detection section 45 and the inner detection section 41 have a temperature exceeding 600° C., the difference in adsorption energy between HC and CO is small, and thus the gradient of the output voltage of the gas sensor 1 in the slightly rich region is less likely to be steep. Accordingly, the temperature of the outer detection section 45 and the inner detection section 41 is more preferably maintained in the range of 450 to 550° C. so that the temperature is close to 500° C.

The formation region in the circumferential direction C of the inner lead section 42 of the reference electrode 4A of the present embodiment is reduced stepwise from the inner detection section 41 toward the inner connecting section 43. The stepwise formation of the inner lead section 42 can achieve a gentle change in surface area of the reference electrode 4A in the axial direction L, in other words, a gentle change in cross-sectional area of the reference electrode 4A in the direction orthogonal to the axial direction L. This increases an area of a boundary portion between the inner lead section 42 of the reference electrode 4A and the solid electrolyte 3. Thus, when the sensor element 2 is heated by the heater 5 so that the temperature of the sensor element 2 is raised to a target temperature, a difference in thermal expansion between the solid electrolyte 3 and the reference electrode 4A caused during the temperature rise is reduced. This mitigates thermal stress applied to the inner lead section 42, and peeling or the like in the inner lead section 42 is less likely to occur.

If a sudden change occurs in the surface area and the cross-sectional area of the boundary portion between the inner detection section 41 and the inner lead section 42 of the reference electrode 4A, the following problem may occur. Specifically, when the sensor element 2 is heated by the heater 5 so that the temperature of the sensor element 2 is raised to a target temperature, during the temperature rise, the difference in thermal expansion between the solid electrolyte 3 and the reference electrode 4A may increase the thermal stress applied to the boundary portion between the inner detection section 41 and the inner lead section 42, and this may cause peeling or the like in the inner lead section 42.

Therefore, the gas sensor 1 of the present embodiment can make the temperature distribution in the axial direction L of the sensor element 2 close to a target temperature distribution by adjusting the shape and the formation region in the circumferential direction C of the inner lead section 42 of the reference electrode 4A. Furthermore, in the slightly rich region, the gas sensor 1 of the present embodiment can be used not only as the oxygen sensor but also as the air-fuel ratio sensor that quantitatively detects a change in the air-fuel ratio. Thus, detection accuracy of the air-fuel ratio in the slightly rich region can be improved.

Similarly, the effects of the present embodiment are also obtained when the formation region in the circumferential direction C of the inner lead section 42 is reduced to form a tapered shape from the inner detection section 41 toward the inner connecting section 43.

<Confirmation Test 1>

As a performance test of the gas sensor 1, a test was performed to measure a difference in rate of change (gradient) of the output voltage of the gas sensor 1 in the slightly rich region and a difference in temperature at each portion in the axial direction L of the sensor element 2 when the electrode reduction rate (S1−S2)/S1×100(%) of the reference electrode 4A was varied. Specifically, samples of the gas sensor 1 in which the electrode reduction rate (S1−S2)/S1×100(%) in the sensor element 2 was varied at 5 levels: 25%, 30%, 50%, 70%, and 75% were prepared as specimens 1 to 5, and rates of change of the output voltage in the specimens 1 to 5 were obtained. A length in the axial direction L of the inner detection section 41 of the reference electrode 4A was set to 10 mm, and a length in the axial direction L of the inner connecting section 43 of the reference electrode 4A was set to 5 mm. The electrode reduction rate in the test was expressed as a percentage.

Dimensions of the outer detection section 45, the outer lead section 46, and the outer connecting section 47 of the detection electrode 4B in the samples were set as follows. As shown in FIG. 3, a total length L1 of the sensor element 2 was set to 40 mm, a length L2 from a tip of the sensor element 2 to a tip of the outer detection section 45 was set to 2 mm, a length L3 of the outer detection section 45 was set to 5 mm, a length L4 from the tip of the sensor element 2 to a tip of the outer connecting section 47 was set to 30 mm, and a length L5 of the outer connecting section 47 was set to 35 mm. The lengths were each indicated as a length in the axial direction L.

In the test, the samples were heated by the heater 5 so that a temperature of the tip of the sensor element 2 was 500° C., and then the temperature of the tip of the sensor element 2 was measured. After the temperature of the tip of the sensor element 2 of the samples was stabilized, rich gas in which carbon monoxide, methane, propane, and nitrogen were mixed was supply to the gas sensor 1 of the samples so that an air-fuel ratio was 0.97. Then, a voltage detected between the reference electrode 4A and the detection electrode 4B was measured as the output voltage (sensor output).

Furthermore, the range of 0.97 to 1.00 in which the excess air ratio λ was in the slightly rich region was divided into three ranges of the excess air ratio λ: the range of 0.97 to 0.98, the range of 0.98 to 0.99, and the range of 0.99 to 1.00, and the rates of change of the output voltage in the three ranges were obtained. Then, a smallest value of the rates of change of the output voltage in the three ranges was determined as the rate of change of the output voltage.

The rates of change of the output voltage in the three ranges were obtained by the following mathematical expressions, where α1 represents the rate of change of the output voltage in the first range, α2 represents the rate of change of the output voltage in the second range, and α3 represents the rate of change of the output voltage in the third range.

$$\alpha 1=(V_{0.97}-V_{0.98})/0.01$$

$$\alpha 2=(V_{0.98}-V_{0.99})/0.01$$

$$\alpha 3=(V_{0.99}-V_{1.00})/0.01$$

Note that $V_{1.00}$ represents the output voltage when the excess air ratio λ is 1.00, $V_{0.99}$ represents the output voltage when the excess air ratio λ is 0.99, $V_{0.98}$ represents the output voltage when the excess air ratio λ is 0.98, and $V_{0.97}$ represents the output voltage when the excess air ratio λ is 0.97.

Depending on whether the rate of change of the output voltage was 10 or more, it was determined whether the rate of change of the output voltage in the slightly rich region was great so that the gradient was steep. When the rate of change was 10 or more, the gradient was determined to be steep and a result of the determination was indicated by ○, and when the rate of change was less than 10, the gradient was determined to be gentle and a result of the determination was indicated by x.

In the test, an internal resistance of the sensor element 2 of the samples was also measured. The internal resistance was measured as a resistance between the reference electrode 4A and the detection electrode 4B. The detection electrodes 4B of the samples had the same shape, and the internal resistance was increased as the electrode reduction rate (S1−S2)/S1×100(%) of the reference electrodes 4A of the samples was increased.

Under a high temperature atmosphere, thermal aggregation may occur in the reference electrode 4A and the detection electrode 4B, and this may cause an increase in the internal resistance of the sensor element 2. Thus, the gas sensor 1 of the samples was placed in an exhaust pipe of an engine, and the engine was operated at 1000 rpm for 1000 hours so that the excess air ratio λ was 0.95. After the operation of the engine, the internal resistance of the sensor element 2 of the gas sensor 1 of the samples was measured. In the determination of the internal resistance, when the internal resistance was 200 kΩ or less, a result of the determination was indicated by ○, and when the internal resistance exceeded 200 kΩ, a result of the determination was indicated by x.

Table 1 shows the results of the determination of the rate of change and the determination of the internal resistance.

TABLE 1

| | Electrode reduction rate [%] | Tip temperature [° C.] | Rate of change of output voltage [—] | Determination of rate of change | Determination of internal resistance |
|---|---|---|---|---|---|
| Specimen 1 | 25 | 501 | 8.3 | x | ○ |
| Specimen 2 | 30 | 503 | 10.4 | ○ | ○ |
| Specimen 3 | 50 | 502 | 12.3 | ○ | ○ |
| Specimen 4 | 70 | 504 | 13.1 | ○ | ○ |
| Specimen 5 | 75 | 504 | 14.2 | ○ | x |

In the specimen 1 in which the electrode reduction rate was less than 30%, the rate of change of the output voltage was less than 10, and thus the result of the determination was indicated by x. In the specimen 5 in which the electrode reduction rate exceeded 70%, the internal resistance exceeded 200 kΩ, and thus the result of the determination was indicated by x. In the specimens 2 to 4 in which the electrode reduction rate was in the range of 30 to 70%, the results of the determination of the rate of change of the output voltage and the determination of the internal resistance were both indicated by ○. The results showed that when the electrode reduction rate of the reference electrode 4A was in the range of 30 to 70%, the change gradient of the output voltage of the gas sensor 1 in the slightly rich region was steep and the internal resistance of the sensor element 2 was low.

The results of the test were obtained in the case shown in FIG. 6 of the embodiment where the inner lead section 42 varied to form a tapered shape from the tip side L1 toward the base end side L2. However, similar results were obtained also in the case shown in FIG. 2 of the embodiment where the inner lead section 42 varied stepwise from the tip side L1 toward the base end side L2.

Furthermore, in the test, a temperature of each portion in the axial direction L of the sensor element 2 of the samples was measured. The temperature was measured by using a thermocouple, while a temperature measurement contact of the thermocouple was in contact with the portion at which the detection electrode 4B was formed. The temperature of each portion was measured at positions at distances of 5 mm, 10 mm, 15 mm, 20 mm, 25 mm, 30 mm, 35 mm, and 40 mm away from the tip of the sensor element 2 toward the base end side L2.

Table 2 shows the results of the measurement of the temperature of the sensor element 2.

at 400° C. or more. At the position at the distance in the range of 25 to 40 mm from the tip of the sensor element 2 toward the base end side L2, however, a smaller electrode reduction rate (S1−S2)/S1×100(%) of the reference electrode 4A caused a more significant reduction in temperature of the sensor element 2. This showed that a greater electrode reduction rate of the reference electrode 4A allows the temperature of the sensor element 2 to be maintained high in a wider region in the axial direction L.

<Confirmation Test 2>

A test was performed to determine an optimum range of the average thickness (μm) of the reference electrode 4A. Specifically, the test was performed to determine responsiveness of the gas sensor 1 and an internal resistance of the sensor element 2 when the average thickness of the reference electrode 4A was varied. Samples of the gas sensor 1 including the sensor element 2 in which the average thickness of the reference electrode 4A was varied at 5 levels: 0.33 μm, 0.40 μm, 1.12 μm, 1.60 μm, and 1.68 μm were prepared as specimens 6 to 10, and the responsiveness and the internal resistance in the specimens 6 to 10 were obtained. A length in the axial direction L of the inner detection section 41 of the reference electrode 4A was set to 10 mm, and a length in the axial direction L of the inner connecting section 43 of the reference electrode 4A was set to 5 mm. The electrode reduction rate (S1−S2)/S1×100(%) of the reference electrode 4A was set to 40%. Furthermore, the samples were heated by the heater 5 so that a temperature of the tip of the sensor element 2 was 500° C., and then the temperature of the tip of the sensor element 2 was measured. Other conditions were similar to those of Confirmation Test 1.

The average thickness of the reference electrode 4A was obtained by measuring a thickness at arbitrary 10 points of the reference electrode 4A by using a fluorescence X-ray thickness meter, and calculating an average value of the thicknesses. The responsiveness of the gas sensor 1 was determined by placing the gas sensor 1 including the sensor element 2 of the samples in the exhaust pipe of the engine and measuring voltage reduction time required for the output voltage of the gas sensor 1 to be reduced from 0.6 V to 0.3V when an air-fuel ratio of the engine was changed multiple times from a fuel rich state in which the excess air ratio λ was 0.95 to a fuel lean state in which the excess air ratio λ was 1.05. In the determination, when the voltage reduction time was 200 ms or less, a result of the determination was indicated by ○, and when the voltage reduction time exceeded 200 ms, a result of the determination was indicated by x. The internal resistance of the sensor element 2 was measured and determined in a similar manner to Confirmation Test 1.

TABLE 2

| | Electrode reduction rate [%] | Tip temperature [° C.] | Position at distance [mm] from tip toward base end side and temperature [° C.] | | | | | | | |
|---|---|---|---|---|---|---|---|---|---|---|
| | | | 5 mm | 10 mm | 15 mm | 20 mm | 25 mm | 30 mm | 35 mm | 40 mm |
| Specimen 1 | 25 | 501 | 501 | 481 | 455 | 417 | 364 | 261 | 204 | 174 |
| Specimen 2 | 30 | 503 | 503 | 500 | 473 | 430 | 373 | 275 | 209 | 170 |
| Specimen 3 | 50 | 502 | 502 | 499 | 485 | 458 | 398 | 283 | 221 | 184 |
| Specimen 4 | 70 | 504 | 504 | 503 | 495 | 470 | 401 | 294 | 224 | 198 |
| Specimen 5 | 75 | 504 | 504 | 498 | 484 | 457 | 405 | 306 | 240 | 218 |

At the position at the distance in the range of 5 to 20 mm from the tip of the sensor element 2 toward the base end side L2, the temperature of the sensor element 2 was maintained Table 3 shows the results of the determination of the responsiveness of the gas sensor 1 and the determination of the internal resistance of the sensor element.

TABLE 3

|  | Electrode reduction rate [%] | Tip temperature [° C.] | Average thickness of reference electrode [μm] | Determination of responsiveness | Determination of internal resistance |
|---|---|---|---|---|---|
| Specimen 6 | 40 | 502 | 0.33 | ○ | x |
| Specimen 7 |  | 501 | 0.40 | ○ | ○ |
| Specimen 8 |  | 503 | 1.12 | ○ | ○ |
| Specimen 9 |  | 503 | 1.60 | ○ | ○ |
| Specimen 10 |  | 498 | 1.68 | x | ○ |

In the specimen 6 in which the average thickness of the reference electrode 4A was 0.33 mm, the internal resistance of the sensor element 2 exceeded 200 kΩ, and thus the result of the determination was indicated by x. In the specimen 10 in which the average thickness of the reference electrode 4A was 1.68 mm, the responsiveness of the gas sensor 1 exceeded 200 ms, and thus the result of the determination was indicated by x. In the specimens 7 to 9 in which the average thickness of the reference electrode 4A was in the range of 0.4 to 1.6 μm, the results of the determination of the responsiveness and the determination of the internal resistance were both indicated by ○. The results showed that when the average thickness of the reference electrode 4A was in the range of 0.4 to 1.6 μm, the responsiveness of the gas sensor 1 was maintained high and the internal resistance of the sensor element 2 was low.

The present disclosure is not limited to only the above embodiment, and can further constitute different embodiments without departing from the scope of the present disclosure. The present disclosure also includes various modified examples and modifications within an equivalent range.

What is claimed is:

1. A gas sensor comprising:
a sensor element including a solid electrolyte that has ionic conductivity and in which a tip portion of a tube having a tubular shape is blocked by a bottom having a curved surface, a detection electrode that is provided on an outer surface of the solid electrolyte and is exposed to detection gas, and a reference electrode that is provided on an inner surface of the solid electrolyte and is exposed to reference gas; and
a heater that has a tip portion including a heating section for heating the solid electrolyte and is arranged inside the solid electrolyte for a tip of the tip portion to contact with the inner surface of the bottom, wherein:
the reference electrode includes
an inner detection section that is provided on an entire periphery in a circumferential direction around a center axis of the tube at a position that is an endmost position on a tip side on the reference electrode and faces the heating section,
an inner connecting section that is provided on an entire periphery or a part in the circumferential direction of the tube at an endmost position on a base end side on the reference electrode and is connected to an inner terminal metal fitting, and
an inner lead section that is provided on a part in the circumferential direction of the tube at a position where the inner detection section is connected to the inner connecting section and that is formed in a formation region in the circumferential direction smaller than a formation region in the circumferential direction of the inner connecting section;
the formation region in the circumferential direction of the inner lead section is reduced stepwise or reduced to form a tapered shape from the inner detection section toward the inner connecting section; and
a rate (S1−S2)/S1 has a relationship of 0.3≤(S1−S2)/S1≤0.7, where S1 represents a surface area of an entire portion of the inner surface of the solid electrolyte and S2 represents a surface area of a part of the entire portion of the inner surface of the solid electrolyte on which the reference electrode is formed, the rate (S1−S2)/S1 being a rate of a surface area of a part of the entire portion of the inner surface of the solid electrolyte on which a reduction of the reference electrode is made.

2. The gas sensor according to claim 1, wherein:
the inner detection section is provided so as to be continuous with an entire periphery at a position on the tip side of the inner surface of the tube and an entire portion of the inner surface of the bottom; and
the tip of the tip portion of the heater is in contact with the inner detection section on the inner surface of the bottom.

3. The gas sensor according to claim 1, wherein the inner lead section is formed parallel to the center axis.

4. The gas sensor according to claim 1, wherein the reference electrode has an average thickness in the range of 0.4 to 1.6 μm.

5. The gas sensor according to claim 1, wherein:
the gas sensor is arranged in an exhaust pipe in which exhaust gas discharged from an internal combustion engine flows;
the gas sensor is used to detect, by using the exhaust gas as the detection gas, an electromotive force generated between the detection electrode and the reference electrode through the solid electrolyte and determine whether an air-fuel ratio of the internal combustion engine is on a rich side on which a ratio of fuel to air is greater than a theoretical air-fuel ratio or on a lean side on which the ratio of fuel to air is greater smaller than the theoretical air-fuel ratio; and
the gas sensor is used to detect, on the basis of the electromotive force, an air-fuel ratio at which an excess air ratio λ is in the range of 0.97 to 1.00, where the excess air ratio λ is 1.00 when the theoretical air-fuel ratio is 14.5, the excess air ratio λ being a value obtained by dividing an air mass flow supplied to the internal combustion engine by a minimum air mass flow theoretically required for complete combustion of fuel.

6. The gas sensor according to claim 1, wherein the inner lead section of the reference electrode is formed so that the formation region in the circumferential direction is reduced in at least three steps from the inner detection section of the reference electrode toward the inner connecting section of the reference electrode in an axial direction of the sensor element.

\* \* \* \* \*